(12) United States Patent
Ohashi

(10) Patent No.: US 6,209,030 B1
(45) Date of Patent: Mar. 27, 2001

(54) METHOD AND APPARATUS FOR CONTROL OF HARD COPYING OF DOCUMENT DESCRIBED IN HYPERTEXT DESCRIPTION LANGUAGE

(75) Inventor: Tadashi Ohashi, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/167,988

(22) Filed: Oct. 8, 1998

(30) Foreign Application Priority Data

Apr. 13, 1998 (JP) .................................................. 10-101060

(51) Int. Cl.⁷ .............................. G06F 13/00; G06F 3/12
(52) U.S. Cl. ......................... 709/219; 709/328; 707/501; 707/527
(58) Field of Search .................................... 709/219, 230, 709/321, 322, 328, 329; 707/500, 501, 513, 527

(56) References Cited

U.S. PATENT DOCUMENTS

| | | | |
|---|---|---|---|
| 5,765,176 | * | 6/1998 | Bloomberg ............................ 707/514 |
| 5,956,034 | * | 9/1999 | Sachs et al. ........................... 345/350 |
| 6,006,242 | * | 12/1999 | Poole et al. ............................ 707/531 |

FOREIGN PATENT DOCUMENTS

| | | |
|---|---|---|
| 63-256448 | 10/1988 | (JP) . |
| 6-348808 | 12/1994 | (JP) . |
| 9-86015 | 3/1997 | (JP) . |

* cited by examiner

*Primary Examiner*—Viet D. Vu
(74) *Attorney, Agent, or Firm*—Staas & Halsey LLP

(57) ABSTRACT

A system of copying a digital document easily maintains the security of the contents of the screen display of, for example, a Web page of the Internet displayed on, for example, a display unit. Tag information indicating the prevention of copying of a screen is included in the hypertext in which a document from a server is described. On the client side, browsing software for actually performing a screen-display using the document interprets the tag information in the hypertext, and prevents making of a copy of the screen when a user issues a request to make a copy of the screen.

27 Claims, 7 Drawing Sheets

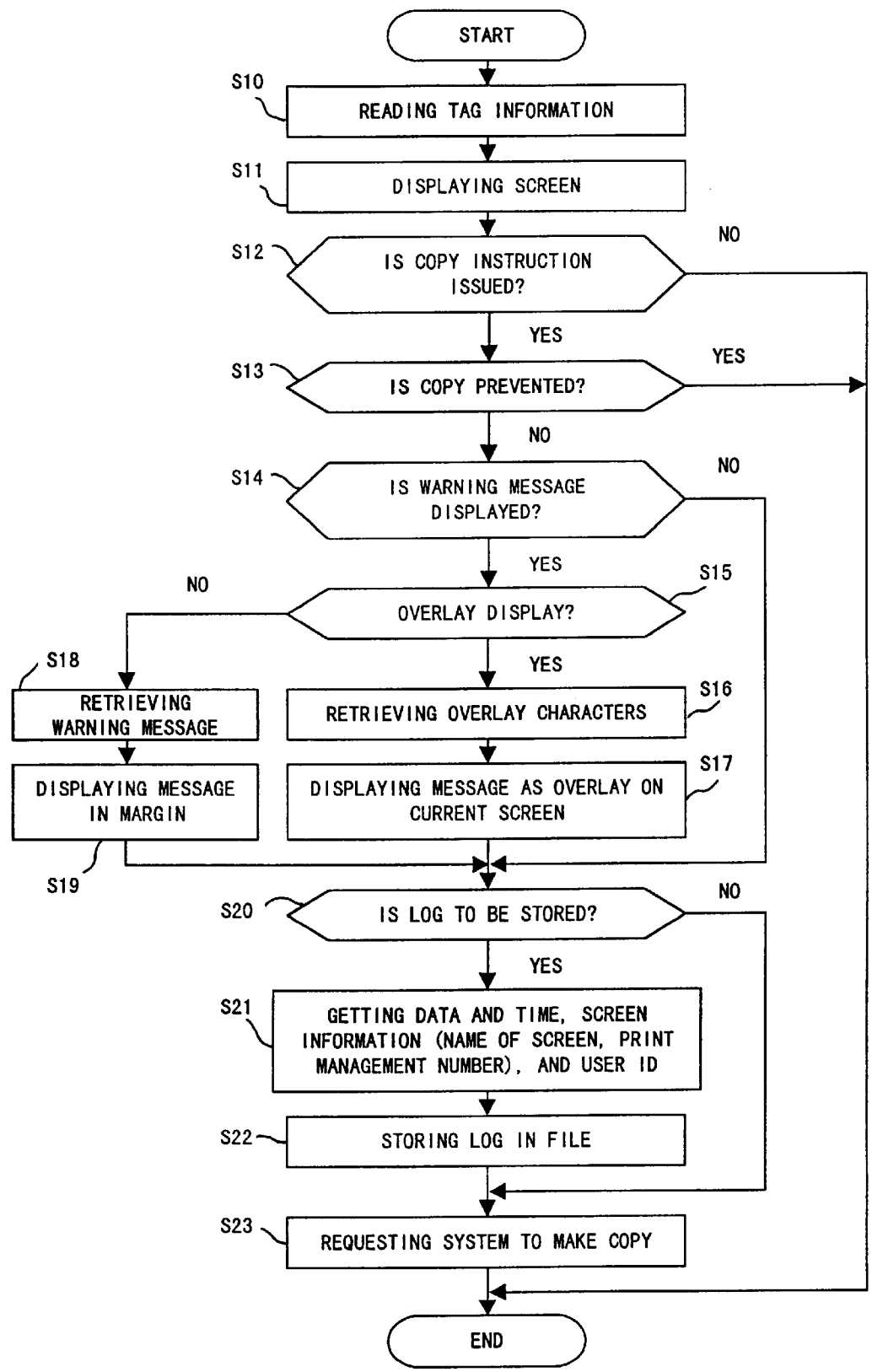
F I G. 6

METHOD AND APPARATUS FOR CONTROL OF HARD COPYING OF DOCUMENT DESCRIBED IN HYPERTEXT DESCRIPTION LANGUAGE

BACKGROUND OF THE INVENTION

1. Field of the Invention

The present invention relates to a system of making a hard copy of a digital document, and more specifically to, for example, a system for control of hard copy to prevent the hard copy of a displayed screen when a Web page transmitted from a WWW (world wide Web) server is displayed on a personal computer using a browser on the Internet, or to display a warning message and make a hard copy when a hard copy is permitted.

2. Description of the Related Art

When a hard copy of document information and image information being displayed on the display screen is to be made, the information can be printed with a special message such as 'confidential', 'important', 'no copying allowed', etc. attached to each page or a cover page, depending on the importance or the confidentiality level of the information.

The technology of automatically adding the above described special messages in special color, for example, red, to the document information when the information is printed, for example, the technology of printing document data stored on a floppy disk with a special message, etc. added in specified color based on the contents preliminarily entered for the document data when the document data is read, and the technology of outputting on the index sheet the complete index information in a comprehensible and confidential format including the index information such as confidential document, an important document, etc. are disclosed in the following documents.

Tokukaisho 63-256448 by Yasuhisa Ishizawa

Document Processing Apparatus

Tokukaihei 9-86015 by Masahiro Ito

System Application Apparatus

Tokukaihei 6-348808 by Tatsuro Yoshioka, et al.

Image Generation and Storage Apparatus

According to an embodiment of the present invention described later, a copy control system is applied when a hard copy of a screen displayed on the display screen is to be made by a browser for browsing sources through the Internet. Therefore, the related conventional technology is described below.

When the Internet is used, an image on a Web page transmitted from a WWW sever through a network is displayed on the display screen using a browser such as Netscape Navigator from the Netscape Corporation, etc. The user normally makes a hard copy of a digital document such as a document, image data, photographs, etc. displayed on the display screen as necessary using a printer connected to, for example, a personal computer.

FIG. 1 shows a conventional technology of copying a Web page described in a hypertext description language, for example, HTML (HyperText Markup Language). In FIG. 1, the Web page transmitted from a WWW server to a client side through a LAN, etc. is received through a line control function in an operating system such as Windows 95 from the Microsoft Corporation, etc., and is interpreted by the browsing software. The line control function receives a Web page from the server side using a user identifier, a user ID, a password, etc. as necessary. The Web page image displayed on the display device by the browser is printed as a hard copy at a request from a user.

Normally, the contents of the Web page, etc. displayed on the display device by a commonly marketed browser are widely circulated. In most cases, there are no problems as to whether or not the user should print the contents. However, if information is confidential or very important, then security control is performed by the access control unit on the WWW server side so that only a specific user assigned a user identifier or a password is allowed to access a URL (Uniform Resources Locator).

As described above, the access to confidential and important information has been limited to a specific user according to the conventional technology, but the specific user can easily make a hard copy of the information displayed by the browser. As a result, for example, the user can have the contents of the hard copy checked by a third party, thereby causing the problem that the confidential information can be revealed to others.

SUMMARY OF THE INVENTION

The present invention aims at easily maintaining the security of information by preventing hard copying of the contents of a Web page of the Internet, and printing a warning message on the hard copy as necessary when hard copying is permitted.

An embodiment of the present invention includes: an interpretation unit for interpreting tag information, which is provided in the hypertext of a document described in a hypertext description language, indicating either the prevention of hard copying of the screen display or the display of a warning message about making hard copy; and a control unit for performing control by, based on the interpretation result from the interpretation unit, either preventing hard copying of the screen display or displaying the warning message about making a hard copy when a user issues a request to make a hard copy.

The hypertext of the document described in a hypertext description language can be preliminarily defined, stored on a computer-readable storage medium, or transmitted from, for example, another computer server through a network such as the Internet, etc.

The tag information provided in the hypertext can indicate either preventing the hard copying or displaying a warning message about making a hard copy, or contain both of these.

Furthermore, the tag information can designate a file which stores information specifying the data of a copy record about the hard copying, for example, the date and time of making a hard copy, the number of copies, a hard-copied document, information specifying the operator of the hard copy, etc. When the tag information is interpreted, control is performed such that the specified file may store the data about the copy record.

The tag information provided in the hypertext can specify a display format of a warning message about making a hard copy, for example, a display format in which a message is displayed in a margin, or an overlay format in which a message is displayed by transparent characters or dot characters as overlay characters on the hard copy. When the message is interpreted, control is performed such that the hard copy of a document can be made by displaying a warning message about making the hard copy in the specified display format.

Furthermore, the functions performed by the control unit and the interpretation unit can be performed by the browsing software for browsing documents. The browsing software can be stored on a computer-readable storage medium. In this case, the present invention can be realized by allowing the computer to read the browsing software.

As described above, the hard copying of a document displayed on a display screen can be prevented according to the present invention. When the hard copying is permitted, the hard copy can contain a warning message to easily maintain the security of the contents of the document.

BRIEF DESCRIPTION OF THE DRAWINGS

The present invention will be more apparent from the following detailed description, when taken in conjunction with the accompanying drawings, in which:

FIG. 6 is a flowchart showing a copy control process when a screen is displayed.

DESCRIPTION OF THE PREFERRED EMBODIMENTS

Figure 2:
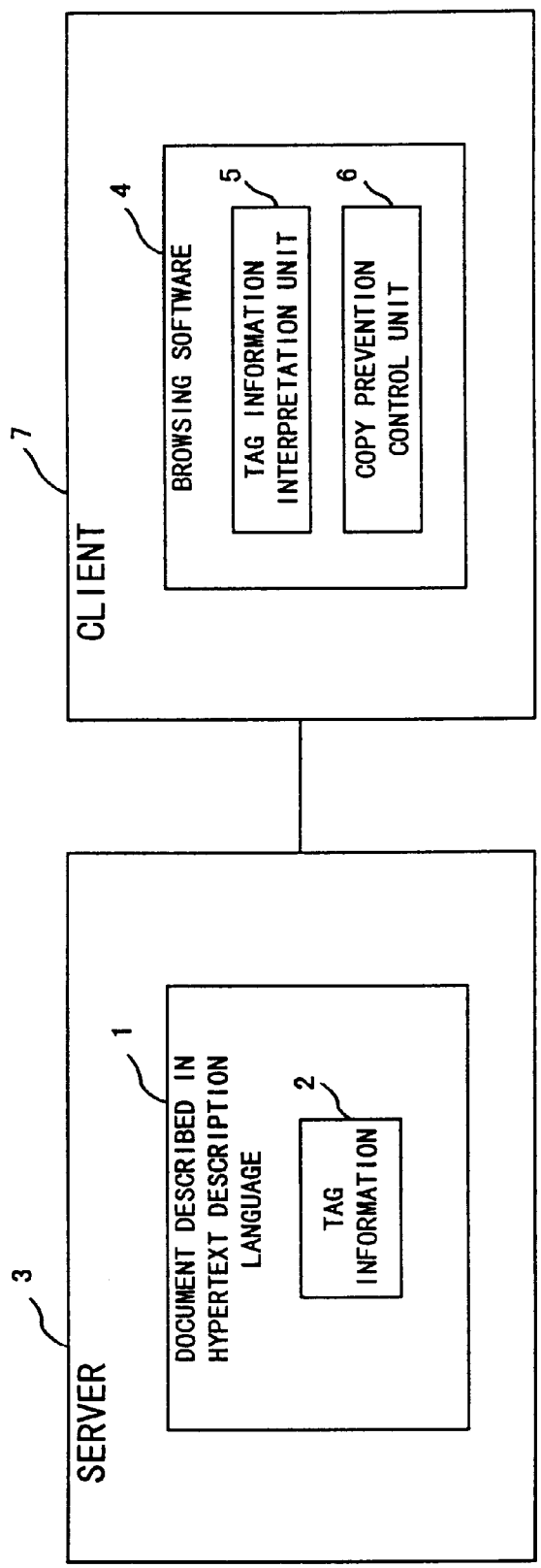
FIG. 2 is a block diagram showing the principle of the present invention.

FIG. 2 is a block diagram showing the principle of the present invention.

In FIG. 2, a document 1 described in a hypertext description language contains, in the hypertext describing the document 1, tag information 2 indicating that copying of the screen displayed by the description of the document is not permitted, or indicating a warning message in response to a copy request from a user. When the document 1 described in a hypertext description language is used in the Internet as an embodiment of the present invention, the document 1 is provided in a server 3.

A browsing software 4 is used in requesting a server 3 to transmit the document 1 described in a hypertext description language and displaying an actual screen display using the document 1 transmitted from the external unit. The browsing software 4 comprises a tag information interpretation unit 5 and a copy prevention control unit 6.

The tag information interpretation unit 5 interprets, in the hypertext describing the document 1, tag information 2 indicating that copying of the screen displayed by the description of the document is not permitted, or indicating a warning message in response to a copy request from a user.

When a user issues a request to copy the screen, the copy prevention control unit 6 performs a control process to display a warning message on the screen, or to prevent making of a copy of the screen. For example, a client 7 includes the browsing software 4 comprising the tag information interpretation unit 5 and the copy prevention control unit 6 when the present invention is used with, for example, the Internet.

In the description above, the browsing software is included in a client. However, it can be included in a server to prevent hard copying or display a warning message when information is displayed at the server.

According to an embodiment of the present invention, the tag information 2 shown in FIG. 2 does not indicate the prevention of hard copying, but indicates a warning message to be displayed on the screen when a user issues a request to make a hard copy of the screen. The warning message can be displayed in a margin on the screen, or can be displayed in an overlay format in which the message is overlaid on the displayed screen. When a user issues a request to copy the screen, the tag information 2 can contain information designating a file which stores data about a copy, for example, the date and time when the copy is made, the number of copies, the contents of the screen, etc.

According to an embodiment of the present invention, the tag information 2 in the document 1 described in a hypertext description language and transmitted from the server 3 is first interpreted by the tag information interpretation unit 5 at a request from the browsing software 4 in the client 7, when the system shown in FIG. 2 is used as a screen display control system for the document described in the hypertext description language. When the user issues a request to make a hard copy of the screen, the copy prevention control unit 6 performs a control process to display a warning message on the screen or to prevent making of a hard copy of the screen as described above.

According to a further embodiment of the present invention, the tag information interpretation unit 5 in the browsing software 4 interprets the contents of the tag information 2 when the document 1 described in a hypertext description language is transmitted to the client 7. A screen copy prevention unit is further provided to prevent the hard copying of the display screen and nullify the screen print menu in the operation menu of the browsing software 4 when the document 1 described in the hypertext description language is loaded onto a buffer.

Figure 3:
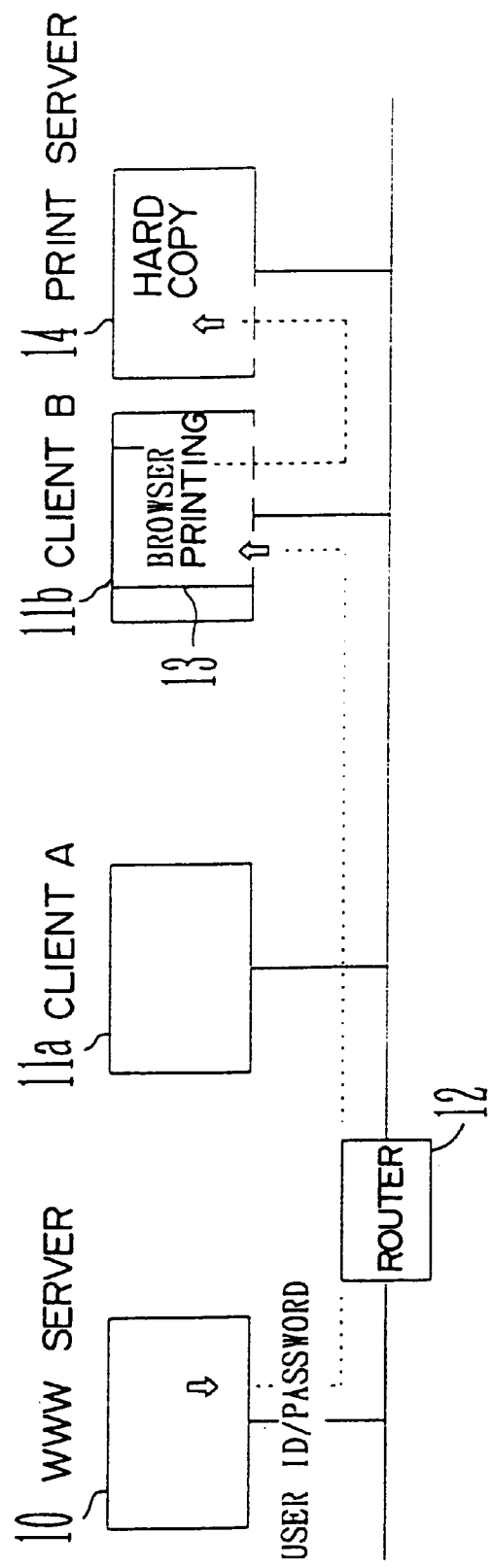
FIG. 3 is a block diagram showing the configuration according to an embodiment of the present invention realized through the Internet.

FIG. 3 is a block diagram showing the configuration according to an embodiment of the present invention when it is connected to the Internet. In FIG. 3, a WWW server 10 is connected to a plurality of clients 11a, 11b, . . . through a router 12. For example, the client B 11b receives a Web page using a user identifier or a password as necessary, and the Web page is displayed by a browser 13. The browser 13 instructs a print server 14 to make a hard copy of the display screen when, for example, a user issues a print instruction through a print menu.

Figure 1:
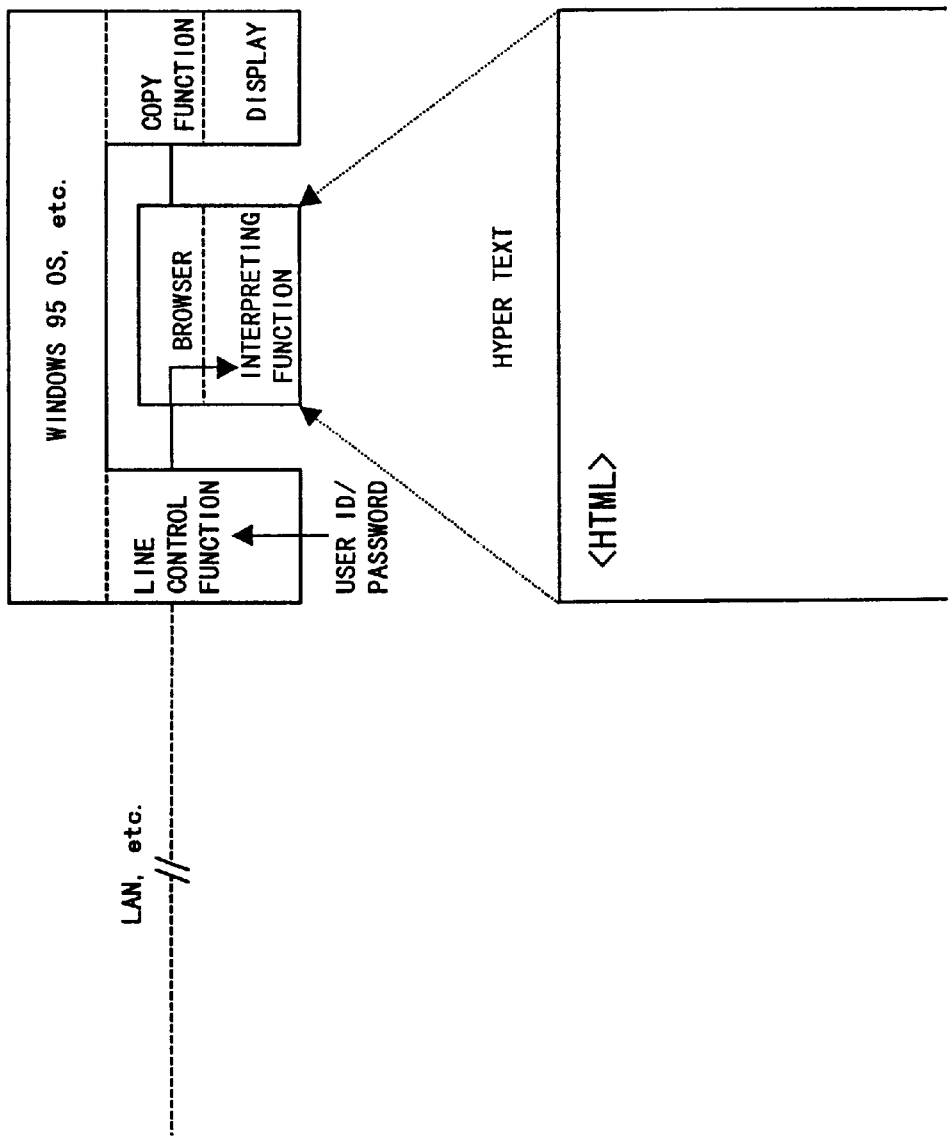
FIG. 1 shows a conventional technology of copying a digital document.
Figure 4:
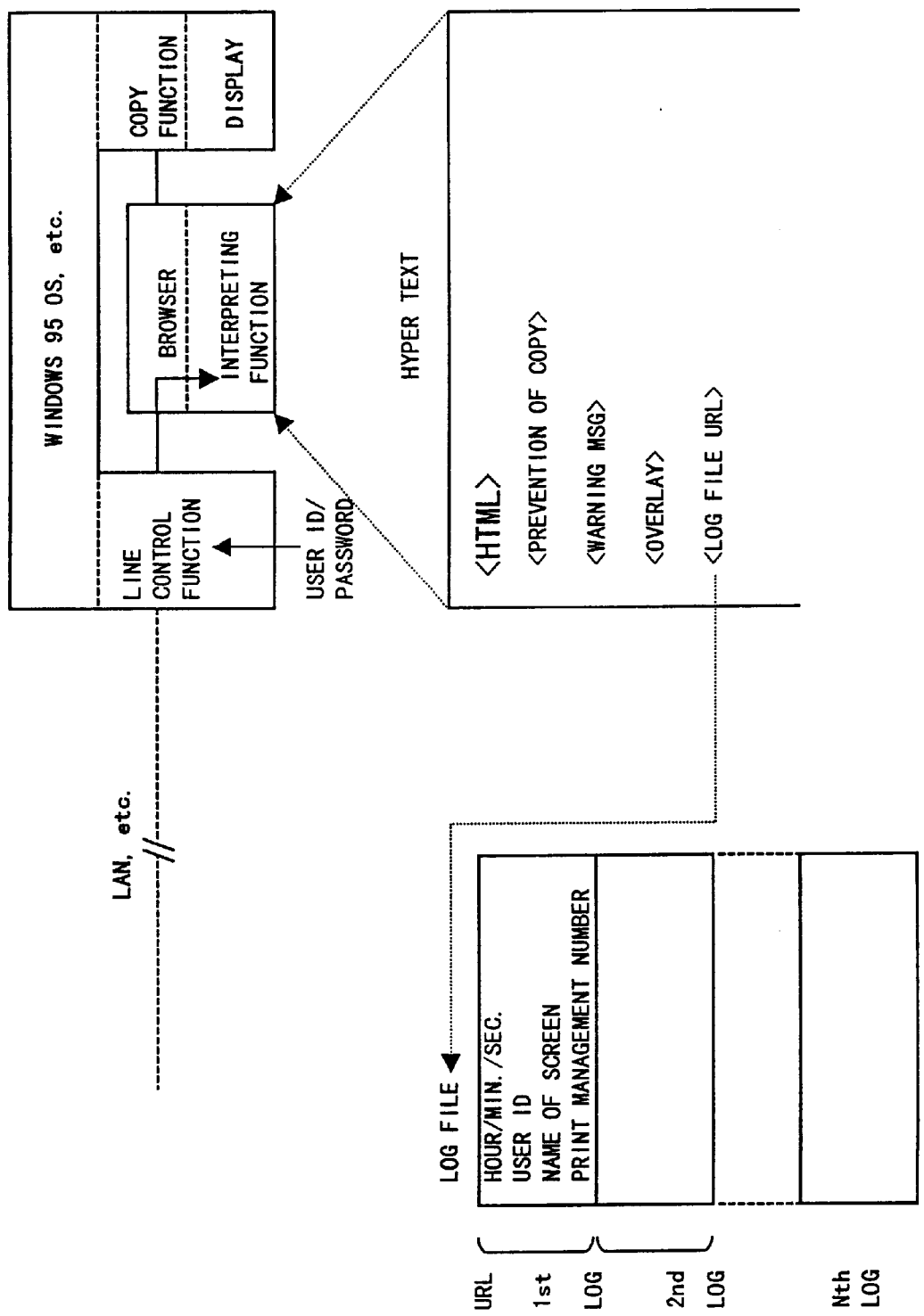
FIG. 4 shows tag information in hypertext used according to an embodiment of the present invention.

FIG. 4 shows the tag information in the hypertext according to an embodiment of the present invention. In FIG. 4, as compared with FIG. 1, various pieces of tag information indicating the prevention of a copy, a warning message, overlay, and a log file URL are described in addition to the HTML data for displaying a Web page in the hypertext. These pieces of tag information are sequentially pointed to by a pointer and interpreted through the interpreter function for interpreting tag information provided in a browser. Thus, the interpreted contents can be processed.

In the tag information newly described in hypertext, the tag information indicating the prevention of hard copying is displayed to prevent hard-copying of the contents of the currently displayed screen on a printer specified on the client side by the interpreter of the browser interpreting the tag information.

The tag information indicating a warning message is issued, when hard copying is permitted, to display a specified warning message, for example, 'CLASSIFIED INFORMATION' in a margin of the screen, and to hard-copy the displayed result and a Web page. The tag information indicating overlay is issued to hard-copy a screen after displaying the warning message, not in a margin of the screen but in an overlay format using transparent characters or dot characters overlaid on the screen.

A log file URL is used to specify the URL to which a log file is allotted. A log file stores as a record of hard copying the date and time of a hard copy, a user ID, the name of the screen to be hard-copied, a print management number, etc. when a hard copy of the screen is made. When a hard copy is made, the record data is stored in the log file specified by the URL.

Figure 5:
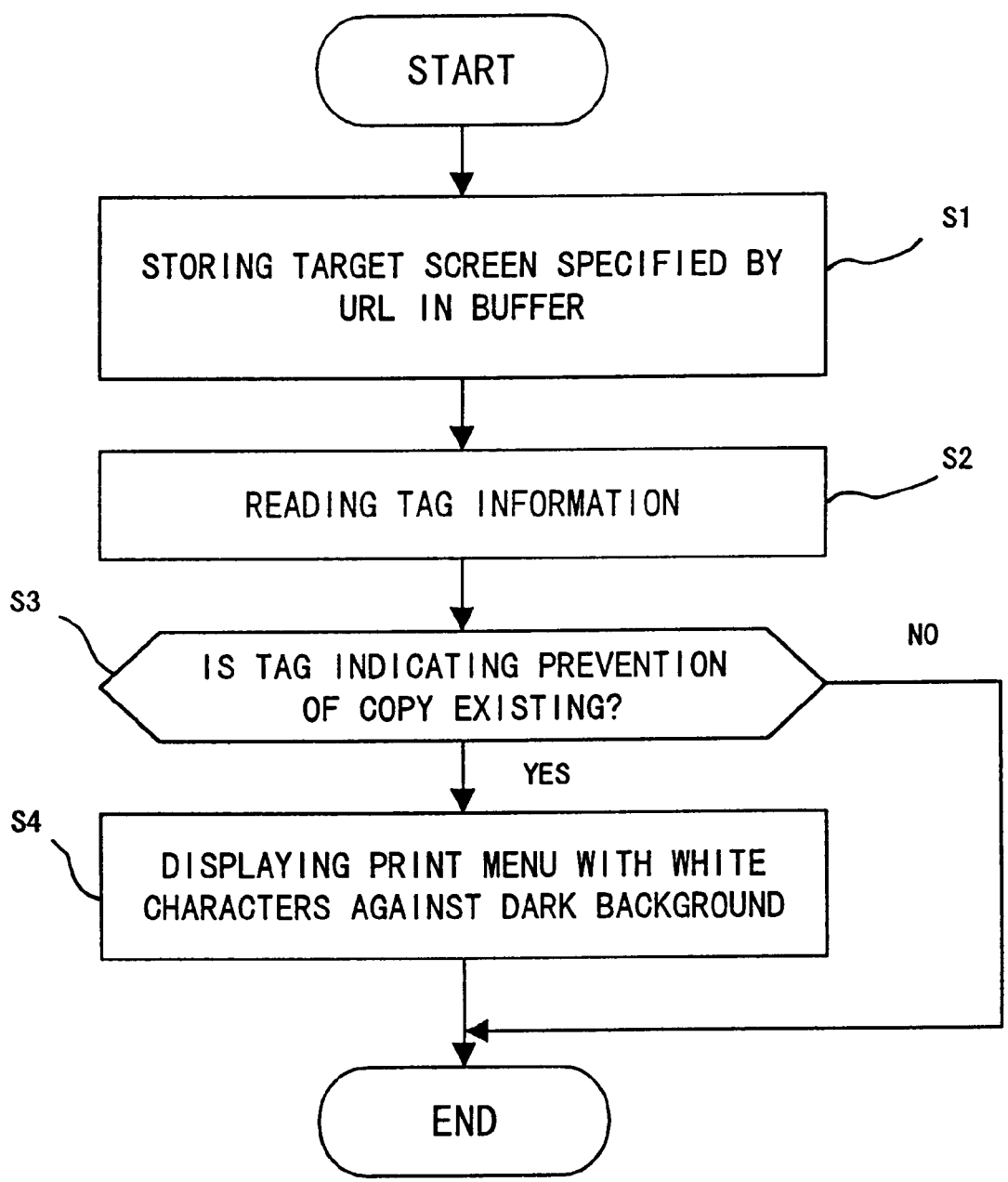
FIG. 5 is a flowchart of a process of loading a document described by a hypertext description language.

FIG. 5 is a flowchart showing the process of loading a document described in a hypertext description language, for example, a Web page, on the client side. The loading process shown in FIG. 5 is described below by assuming that, upon loading the Web page into, for example, a buffer on the client side in the example shown in FIG. 3, tag information is interpreted by a display control program of the present invention. In the user operation menu of the browser, the print menu is assumed to be nullified.

When the process starts as shown in FIG. 5, a target screen specified by the URL in step S1, for example, a Web page, is stored in a buffer, tag information is read in step S2, and it is determined in step S3 whether or not tag information indicating the prevention of a copy is included. When the tag information is included, the print menu in the user operation menu of the browser is displayed against a black background in step S4. Thus, the menu itself is nullified. On the other hand, when the tag information indicating the prevention of a copy is not included, the process terminates without performing the process of step S4.

FIG. 6 is a flowchart showing the hard copy control process performed when a screen such as a Web page is displayed. In FIG. 6, the copy control process is performed after it is determined, when the screen is displayed, whether of not hard copying is specified.

When the process starts as shown in FIG. 6, the tag information in the hypertext is first read in step S10. Then, the screen is displayed in step S11, and it is determined in step S12, for example, whether or not a user has issued an instruction to make a hard copy. If not, the process immediately terminates.

If it is determined that an instruction to make a hard copy has been issued, then it is determined whether or not tag information indicating the prevention of a copy is included. If a copy is to be prevented, the process immediately terminates.

When a copy is not to be prevented, it is determined based on the tag information in step S14 whether or not a warning message should be displayed. When it should be displayed, it is further determined based on the tag information in step S15 whether or not the warning message is represented in the overlay format. If it is represented in the overlay format, overlay characters are retrieved from a predetermined area in step S16. In step S17, the overlay characters are overlaid on the current screen, and control is passed to the process of step S20.

When it is determined in step S15 that the message is not represented in the overlay format, a warning message is retrieved from a predetermined area in step S18, and the warning message is displayed in a margin of the screen in step S19. Then, control is passed to the process of step S20. If it is determined in step S14 that there is no instruction to display the warning message, control is immediately passed to the process of step S20.

It is determined in step S20 whether or not copy record data obtained when a hard copy is made, that is, a log, is to be stored, and if so, the date and time, the screen information, for example, the URL address to which the Web page is allotted, etc. are obtained in step S21. After the information is stored as a log in the specified file in step S22, control is passed to the process of step S23. If it is determined in step S20 that no log is required, then control is immediately passed to the process of step S23. Then, in step S23, the system on the client side, that is, the operating system, is requested to make a hard copy, thereby terminating the process.

In FIG. 6, when the screen is displayed, it is determined whether or not a hard copy instruction has been issued, and a copy control process is performed. However, it is obvious that the processes in and after step S13 can be performed when a user issues a copy instruction after viewing the displayed screen.

Furthermore, in FIG. 6, the process terminates without displaying a warning message when hard copying is prevented. However, the process can be terminated after the warning message indicating the prevention of copying is retrieved from a predetermined area and displayed on the screen.

Figure 7:
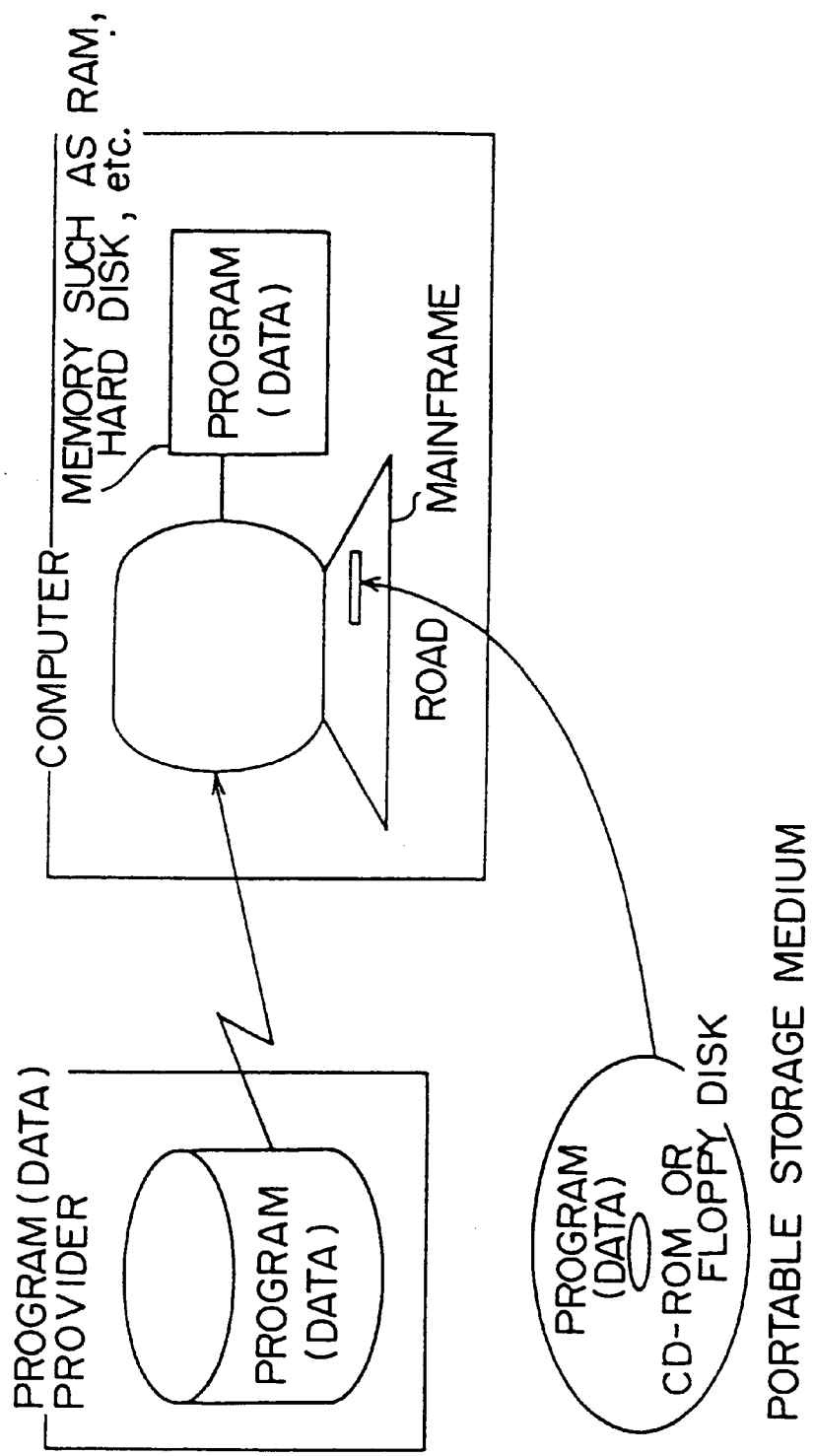
FIG. 7 is a block diagram showing a storage medium which stores a hard copy control program according to the present invention.

FIG. 7 is a block diagram showing the cases when a hard copy control program according to the present invention shown in FIGS. 5 or 6 is stored on a portable storage medium such as CD-ROM, a floppy disk, etc., when it is downloaded through a communications circuit, or when it is stored in memory such as RAM, a hard disk, etc.

In the descriptions above, browsing software is provided on a client side, but it also can be provided on a server side to prevent hard copying or display a warning message when the server itself displays the screen.

Furthermore, a display control program having the function of interpreting tag information according to the present invention can be incorporated into the browsing software.

In the descriptions above, the embodiment of the present invention is described using HTML as an example of a hypertext description language. However, it is obvious that a hypertext description language is not limited to HTML, and, for example, SGML (Standard Generalized Markup Language) can be used.

As described above, confidential information can be protected from being copied on a client side according to the present invention, thereby maintaining the security of the information. On the other hand, non-confidential information can be freely copied by users. When specific confidential information can be copied, for example, it is displayed with a warning message such as 'Use this confidential document carefully.' when it is actually copied. Thus, the security of the document can be successfully maintained. Furthermore, since a record of a copy is stored in a file when a user makes the copy, the security of the information can be maintained by verifying the record. Therefore, the present invention does much to answer the requests to maintain the practicality of the Internet and the security of information.

What is claimed is:

1. A method of controlling hard copying when a request is issued to make a hard copy of a document described in a hypertext description language on a display screen of a display unit of a computer terminal using a browsing software, comprising:

interpreting first tag information contained in a hypertext in which the document is described;

outputting a warning message about making a hard copy based on an interpretation result of the first tag information;

interpreting second tag information contained in the hypertext in which the document is described; and preventing the hard copying based on an interpretation result of the second tag information.

2. The method according to claim 1 wherein:
said first tag information indicates outputting of the message as being overlaid on the hard copy of the document.

3. The method according to claim 1, further comprising:
interpreting third tag information contained in the hypertext in which the document is described; and
specifying a file which stores data of hard copying records of the document based on an interpretation result of the third tag information.

4. The method according to claim 2, further comprising:
interpreting third tag information contained in the hypertext in which the document is described; and
specifying a file which stores data of hard copying records of the document based on an interpretation result of the third tag information.

5. The method according to claim 3 wherein:
said data of the copy record contains a user ID of a user who requests the hard copy, and a time at which the hard copy is made.

6. The method according to claim 4 wherein:
said data of the copy record contains a user ID of a user who requests the hard copy, and a time at which the hard copy is made.

7. The method according to claim 1, further comprising:
obtaining hypertext, in which the document is described and the first and second tag information is contained, from an external computer connected to the computer terminal through a communications circuit.

8. The method according to claim 1, further comprising:
obtaining hypertext, in which the document is described and the first and second tag information are contained, from an external computer connected to the computer terminal through a communications circuit.

9. The method according to claim 3, further comprising:
obtaining hypertext, in which the document is described and the first, second and third tag information are contained, from an external computer connected to the computer terminal through a communications circuit.

10. The method according to claim 1, wherein:
said operations are contained in a browsing software.

11. A method of controlling hard copying of a document described in a hypertext description language, comprising:
interpreting tag information, contained in a hypertext in which a screen display of the document is described, indicating either prevention of hard copying of the screen display or displaying of a warning message about making a hard copy;
performing control of preventing hard copying of the screen display based on an interpretation result of the tag information when a user issues a request to make a hard copy; and
performing control of displaying a warning message about making a hard copy based on an interpretation result of the tag information when a user issues a request to make a hard copy.

12. An apparatus for controlling a screen display of a document described in a hypertext description language, comprising:
an interpretation unit interpreting tag information, contained in hypertext in which a screen display of the document is described, indicating either prevention of hard copying of the screen display or displaying of a warning message about making a hard copy;
a first control unit performing control of preventing hard copying of the screen display based on an interpretation result from said interpretation unit when a user issues a request to make a hard copy; and
a second control unit performing control of displaying a warning message about making a hard copy based on an interpretation result from said interpretation unit when a user issues a request to make a hard copy.

13. A computer-readable storage medium storing a browsing software used to direct a computer to display a document described in a hypertext description language, said browsing software stored in the storage medium comprising:
directing the computer to interpret first tag information indicating prevention of hard copying of a screen display and second tag information indicating displaying of a warning message about making a hard copy, said first and second tag information being contained in hypertext in which a screen display of the document is described;
directing the computer to prevent hard copying of the screen display based on an interpretation result of the tag information when a user issues a request to make a hard copy; and
directing the computer to display a warning message about making a hard copy of the screen display based on an interpretation result of the tag information when a user issues a request to make a hard copy.

14. A computer-readable storage medium storing control software for controlling execution of a computer with browsing software used to direct the computer to display a document described in a hypertext description language, said control software stored in the storage medium comprising:
directing the computer to interpret first tag information indicating prevention of hard copying of the screen display and second tag information indicating displaying of a warning message about making a hard copy, said first and second tag information being contained in hypertext in which a screen display of the document is described;
directing the computer to prevent hard copying of the screen display based on an interpretation result of the tag information when a user issues a request to make a hard copy; and
directing the computer to display a warning message about making a hard copy of the screen display based on an interpretation result of the tag information when a user issues a request to make a hard copy.

15. A computer-readable storage medium for storing document written in a hypertext description language for describing a screen display of the document, said document comprising:
first tag information, being interpreted by a computer, directing the computer to prevent hard copying of the screen display from a request to make a hard copy; and
second tag information, being interpreted by a computer. directing the computer to display a warning message about making a hard copy against a request to make a hard copy.

16. A system having a server containing a plurality of documents described in a hypertext description language, and a client containing a browsing software, connected to the server through a network, for requesting the server to access the documents and for screen-displaying a document transmitted from the server, said system controlling screen-displaying of a document described in a hypertext description language, and comprising:

an including unit including, in hypertext in which a screen display of the document in the server is described, tag information indicating either prevention of hard copying of the screen display performed by executing browsing software or displaying of a warning message about making a hard copy;

an interpretation unit interpreting the tag information in hypertext in which the screen display of the document is described;

a first control unit controlling preventing hard copying of the screen display based on an interpretation result of the tag information when a user issues a request to make a hard copy; and a second control unit controlling displaying a warning message about making a hard copy based on an interpretation result of the tag information when a user issues a request to make a hard copy.

17. The apparatus according to claim 12, wherein:

said second control unit performs control of displaying the warning message as being overlaid on the hard copy of the document.

18. The apparatus according to claim 12, further comprising:

a third control unit performing control of storing data of hard copying records of the document.

19. Browsing software embodied on a transmission medium and used to direct a computer to display a document described in a hypertext description language, said browsing software comprising the operations of:

directing the computer to interpret first tag information indicating prevention of hard copying of a screen display and second tag information indicating displaying of a warning message about making a hard copy, said first and second tag information being contained in hypertext in which a screen display of the document is described;

directing the computer to prevent hard copying of the screen display based on an interpretation result of the tag information when a user issues a request to make a hard copy; and directing the computer to display a warning message about making a hard copy of the screen display based on an interpretation result of the tag information when a user issues a request to make a hard copy.

20. Control software embodied on a transmission medium and for controlling execution of a computer with browsing software used to direct the computer to display a document described in a hypertext description language, said control software comprising the operations of:

directing the computer to interpret first tag information indicating prevention of hard copying of the screen display and second tag information indicating displaying of a warning message about making a hard copy, said first and second tag information being contained in hypertext in which a screen display of the document is described;

directing the computer to prevent hard copying of the screen display based on an interpretation result of the tag information when a user issues a request to make a hard copy; and directing the computer to display a warning message about making a hard copy of the screen display based on an interpretation result of the tag information when a user issues a request to make a hard copy.

21. A document data embodied on a transmission medium and written in a hypertext description language for describing a screen display of the document, said document data comprising:

first tag information, being interpreted by a computer, directing the computer to prevent hard copying of the screen display from a request to make a hard copy; and second tag information, being interpreted by a computer, directing the computer to display a warning message about making a hard copy against a request to make a hard copy.

22. A computer data signal embodied in a carrier wave and representing browsing software used to direct a computer to display a document described in a hypertext description language, said browsing software comprising the operations of:

directing the computer to interpret first tag information indicating prevention of hard copying of a screen display and second tag information indicating displaying of a warning message about making a hard copy, said first and second tag information being contained in hypertext in which a screen display of the document is described;

directing the computer to prevent hard copying of the screen display based on an interpretation result of the tag information when a user issues a request to make a hard copy; and directing the computer to display a warning message about making a hard copy of the screen display based on an interpretation result of the tag information when a user issues a request to make a hard copy.

23. A computer data signal embodied in a carrier wave and representing control software for controlling execution of a computer with browsing software used to direct the computer to display a document described in a hypertext description language, said control software comprising the operations of:

directing the computer to interpret first tag information indicating prevention of hard copying of the screen display and second tag information indicating displaying of a warning message about making a hard copy, said first and second tag information being contained in hypertext in which a screen display of the document is described;

directing the computer to prevent hard copying of the screen display based on an interpretation result of the tag information when a user issues a request to make a hard copy; and directing the computer to display a warning message about making a hard copy of the screen display based on an interpretation result of the tag information when a user issues a request to make a hard copy.

24. A computer data signal embodied in a carrier wave and representing a document written in a hypertext description language for describing a screen display of the document, said document comprising:

first tag information, being interpreted by a computer, directing the computer to prevent hard copying of the screen display from a request to make a hard copy; and second tag information, being interpreted by a computer, directing the computer to display a warning message about making a hard copy against a request to make a hard copy.

25. A method of controlling hard copying when a request is issued to make a hard copy of a document described in a hypertext description language on a display screen of a display unit of a computer terminal using a browsing software, comprising:

interpreting first tag information contained in a hypertext in which the document is described;

outputting a warning message about making a hard copy based on an interpretation result of the first tag information;

interpreting third tag information contained in the hypertext in which the document is described;

specifying a file which stores data of hard copying records of the document based on an interpretation result of the third tag information; and obtaining hypertext, in which the document is described and the first, second and third tag information are contained, from an external computer connected to the computer terminal through a communications circuit.

26. A method comprising:

outputting a warning message about making a hard copy, if a first tag information is found in a file; and preventing hard copying of a portion of the file, if a second tag information is found in the file.

27. A computer readable storage medium storing a program to instruct a computer to perform:

outputting a warning message about making a hard copy, if a first tag information is found in a file; and preventing hard copying of a portion of the file, if a second tag information is found in the file.

* * * * *